United States Patent [19]  [11] 3,888,752
Eldred  [45] June 10, 1975

[54] PHOSPHITE ESTER ANTIOXIDANTS IN RADIATION CURED STYRENE BUTADIENE ELASTOMERS

[75] Inventor: Roger J. Eldred, Detroit, Mich.

[73] Assignee: General Motors Corporation, Detroit, Mich.

[22] Filed: Nov. 28, 1973

[21] Appl. No.: 419,702

[52] U.S. Cl. ... 204/159.18; 204/159.17; 204/159.2; 260/33.6 AQ; 260/42.32; 260/45.7 P; 260/45.7 PS; 260/45.8 R; 260/879
[51] Int. Cl. ............................. B01j 1/10; B01j 1/12
[58] Field of Search ................... 204/159.18, 159.2; 260/45.7 PS, 45.7 P, 45.8 R

[56] References Cited
UNITED STATES PATENTS
3,057,791  10/1962  Anderson .......................... 204/159.2
3,261,804  7/1966  Graham ........................... 204/159.18

Primary Examiner—Murray Tillman
Assistant Examiner—Richard B. Turer
Attorney, Agent, or Firm—George A. Grove

[57] ABSTRACT

Certain organic phosphite esters have been shown to be effective antioxidants in a radiation cured styrene-butadiene copolymer system. Such antioxidants are selected from the group consisting of a pentaerythritol diphosphite having the general formula:

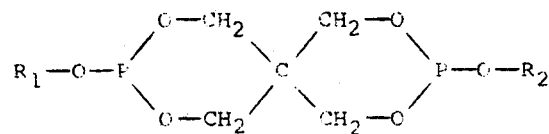

where $R_1$ and $R_2$ are alkyl groups containing from 12 to 20 carbon atoms, a trithio phosphite having the general formula:

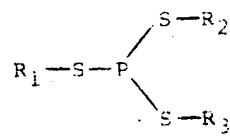

where $R_1$, $R_2$ and $R_3$ are alkyl groups containing from 10 to 15 carbon atoms and a hexathio diphosphite having the general formula:

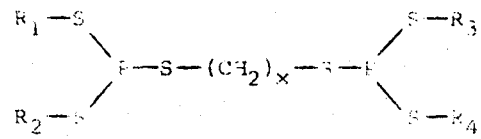

where $R_1$, $R_2$, $R_3$ and $R_4$ are alkyl groups containing from 10 to 15 carbon atoms and $x$ is from 4 to 8.

3 Claims, No Drawings

PHOSPHITE ESTER ANTIOXIDANTS IN RADIATION CURED STYRENE BUTADIENE ELASTOMERS

This invention relates to a method of producing a radiation cured styrene-butadiene copolymer which has protection against oxidative degradation. More specifically, this invention relates to the use of certain organic phosphite esters as antioxidants in this copolymer system. These phosphite esters do not interfere with the radiation curing process and survive that process in sufficient concentrations to provide adequate long-term protection for the cured elastomer.

One of the ever present problems in the utilization of polymeric compounds is the rapid deterioration due to chemical degradation during aging. This loss is caused by the polymer's susceptibility to chemical attack by free radicals and other reactive chemical groups; one typical degradation reaction is the simple oxidation of the polymer molecule. This degradation reaction usually causes chain scission which reduces the molecular weight and causes a reduction in the modulus and tensile strength.

Traditionally, these problems have been solved by the addition of chemical compounds which inhibit the degradation process by combining with the free radical or other chemically active group before it has a chance to degrade the polymer molecule. These inhibitors are termed "antioxidants" because oxidative attack is the most common cause of deterioration. The term "stabilizer" is often loosely used interchangeably with antioxidant; however, a stabilizer does not prevent the initial chemical attack on the polymer, but instead protects the polymer from attack by the reaction products of the initial reaction. For example, a stabilizer will not prevent the dehydrochlorination of poly(vinyl chloride), however, it will protect this polymer from being attacked by hydrogen chloride, a product of the initial reaction. Moreover, the term stabilizer is used for materials which protect polymers during isolation and storage, antioxidants are materials which protect them during processing and protect the finished product.

Hereafter the phosphite esters will be referred to as antioxidants as this term more aptly defines their function. Technically, these esters are strong reducing agents which, through an ionic mechanism, reduce chemically active groups, such as a peroxide to an innocuous substance such as water. Each antioxidant molecule is capable of combining with one free radical or reactive chemical group; and once this has occurred, that antioxidant molecule is consumed. Therefore, the concentration of the antioxidant in the cured material becomes very critical, as a specific concentration will provide protection for a finite time period in a specific environment; and once the antioxidant content is depleted the polymer will readily degrade.

The advent of the radiation curing or crosslinking process presented new problems because the conventional antioxidants used in sulfur cured compositions were not able to survive the radiation process and it is very difficult to incorporate an inhibitor into a cured material. The first antioxidant candidate that would survive the radiation process interfered with this crosslinking process to such an extent that it was necessary to significantly increase the radiation dosage to effectively crosslink the material. This, of course, would increase the cost of any production operation.

The styrene-butadiene elastomers presented this problem in its typical form. These materials are random copolymers which may be crosslinked or vulcanized by either a sulfur initiated mechanism or a process which utilizes high energy radiation. The result of either process is a periodic chemical bond between two adjacent polymer chain segments. This crosslinking or curing enhances some of the physical properties of the material such as its resiliency, strength and modulus. However, up to the present time no antioxidant has been found to be effective in the radiation crosslinked styrene-butadiene elastomeric system.

The sulfur curing process has been well developed and refined over the years and has many industrial applications. There are a variety of antioxidants such as the hindered phenols which will provide adequate long-term protection for a sulfur cured styrene-butadiene elastomer. However, these compounds are ineffective in protecting this same material if it is cured by a radiation process. Apparently, the radiation process destroys the ability of these compounds to combine with the free radicals or other reactive groups. When candidates were found that would survive the radiation process it was necessary to increase the radiation dosage by as much as 25 percent to effectively crosslink the elastomer.

It is an object of this invention to provide a radiation process for a styrene-butadiene copolymer composition having a suitable antioxidant which is substantially nonreactive and noncatalytic during the curing process.

It is a further objective of this invention to provide a radiation cured styrene-butadiene copolymer composition having good properties in the as-cured condition and which contains a sufficient concentration of an effective antioxidant to provide adequate long-term protection against oxidative degradation.

In accordance with a preferred embodiment of my invention, these and other objectives and advantages are provided by first combining a noncrosslinked styrene-butadiene copolymer with a suitable crosslinking monomer and a suitable organic phosphite ester or mixture of such esters. I have found that phosphite esters taken from the following group are effective antioxidants in radiation cured, styrene-butadiene elastomers when used in concentrations of preferably about 2 to 15 percent by weight of the composition prepared for curing. The group consists of a pentaerythritol diphosphite having the general formula:

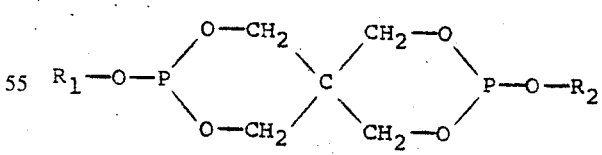

where $R_1$ and $R_2$ are alkyl groups containing from 12 to 20 carbon atoms, a trithio phosphite having the general formula:

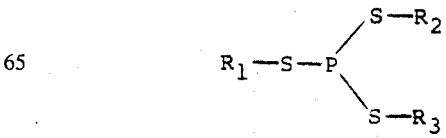

where $R_1$, $R_2$ and $R_3$ are alkyl groups containing from 10 to 15 carbon atoms and a hexathio diphosphite having the general formula:

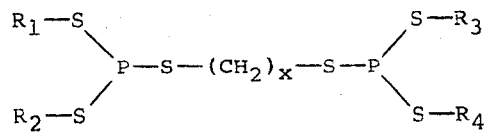

where $R_1$, $R_2$, $R_3$ and $R_4$ are alkyl groups containing from 10 to 15 carbon atoms and $x$ is from 4 to 8. The utilization of these phosphite esters as antioxidants does not preclude the use of the conventional polymer additives such as fillers, plasticizers and stabilizers. These components are roll-milled into a homogeneous mixture and pressed into a sheet in preparation for the conventional radiation process. The phosphite ester neither affects this curing operation nor is it appreciably affected by it.

In general, a large class of phosphite esters have been used as secondary antioxidants in thermoplastic polymer applications such as the polyolefins. In these previous applications the phosphite esters acted synergistically with the primary antioxidants to provide protection for these materials. However, the phosphite esters have not been utilized as antioxidants in crosslinked styrene-butadiene copolymer systems because these elastomers have been cured almost exclusively by the sulfur vulcanizing process and the phosphite esters are not able to survive that cure in adequate concentrations to provide even short-term protection.

Thus we have two mutually exclusive groups of antioxidants — the conventional inhibitors such as the hindered phenols which are capable of protecting a sulfur cured, styrene-butadiene elastomer and the subject organic phosphite esters which I have found to be capable of protecting the radication cured, styrene-butadiene elastomer. Neither type of antioxidant is suitable in the other application. Tables I and II contain data from experiments testing the effectiveness of various antioxidants from both groups in the sulfur cured and radiation cured processes and they clearly illustrate this mutual exclusivity The tensile data in Table I was taken from samples which were sulfur cured. The formulation consisted, by weight, of 100 parts styrene-butadiene copolymer, 50 parts carbon black N550, 10 parts of circosol 4240 which is a processing oil, 5 parts zinc oxide, 2.0 parts sulfur, 2 parts accelerator, and about 2 parts of the phosphite ester antioxidant. This mixture was roll-milled into a uniform blend and heated for 20 minutes at 310° F.

The radiation cured samples with the conventional antioxidants had the same basic formulation except that the sulfur and the accelerator were replaced by 8 percent by weight of a crosslinking monomer, trimethylol propane trimethacrylate. The uncured samples were blended on a roll-mill and then subjected to a radiation dose of 16 megarads by a 1.5 Mev accelerator. The tensile properties of these samples, both aged and nonaged are reported in Table II.

Table I demonstrates that the selected phosphite esters which I have found to be effective in the radiation curing process were totally ineffective when used in a sulfur cured process. Apparently these compounds are simply incapable of surviving the sulfur initiated crosslinking process. Note, in Table II, the total lack of activity of the conventional inhibitors in the radiation cured system. This failure was observed as early in the aging process as 24 hours. Also observe the deleterious effect of antioxidant 2246, a commercially available hindered phenol, and phenol-β-naphthylamine on the extent of cure at a dosage of 16 megarads. These compounds interfered with the crosslinking process and thereby reduced the cure by as much as one-half.

Table I

The Effects Of The Phosphite Esters In A Sulfur Cured System

| Antioxidant | Original Tensile Strength (PSI) | Tensile Strength After Aging 70 Hours At 257° F. |
|---|---|---|
| Trilauryl trithio phosphite (TLTTP) | 2450 | 600 |
| A hexathio diphosphite compound | 2300 | 800 |
| Distearyl pentaerythritol diphosphite | 2500 | 700 |

Table II

Effects Of Conventional Antioxidants In A Radiation Cured Styrene-Butadiene System

| Antioxidant | Extent Of Cure At 16 Mrad. | Original Tensile Strength (PSI) | Tensile Strength After Aging 70 Hours At 257° F. |
|---|---|---|---|
| None | 100% | 2100 | 500 |
| Hindered phenol | 50% | 1900 | 400 |
| Distearyl thio dipropionate (DSTDP) | 100% | 2100 | 700 |
| Phenyl-β- naphthylamine | 60% | 1800 | 300 |

A preferred formulation of this invention consists essentially of a styrene-butadiene copolymer with a styrene-butadiene ratio of 23.6 to 76.4, carbon black as an inert reinforcing filler at a concentration of 26 percent by weight, and a crosslinking monomer, trimethylolpropane trimethacrylate, at a concentration of 8 percent by weight. A crosslinking monomer is often used in the radiation curing of elastomers to facilitate the curing process and thereby reduce the required dosage from about 50 megarads to about 15 megarads. Many multifunctional monomers, both acrylic and nonacrylic, will serve this purpose. The multifunctionality, which is usually two or more sites of ethylenic unsaturation, allows the monomer molecule to react with the two or more adjacent polymer segments and by this mechanism crosslink the polymer matrix.

The antioxidants were selected from a group consisting of a pentaerythritol diphosphite having the general formula:

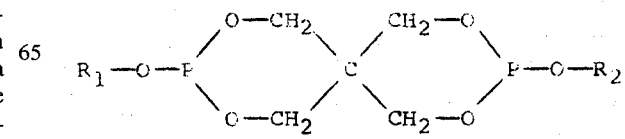

where $R_1$ and $R_2$ are alkyl groups containing from 12 to 20 carbon atoms, a trithio phosphite having the general formula:

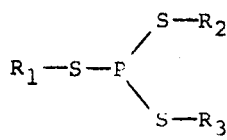

where $R_1$, $R_2$ and $R_3$ are alkyl groups containing from 10 to 15 carbon atoms and a hexathio diphosphite having the general formula:

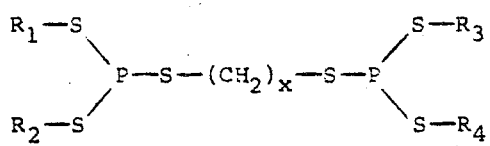

where $R_1$, $R_2$, $R_3$ and $R_4$ are alkyl groups containing from 10 to 15 carbon atoms and $x$ is from 4 to 8. These phosphite ester compounds were found to be effective antioxidants at concentrations of about 2 percent by weight of the total composition and it should be understood that the upper concentration limit is that which begins to alter the physical properties of the elastomer.

The effectiveness of these antioxidants was tested by aging the radiation cured elastomers at 257° F. for 70 hours and then testing the tensile properties of the specimen and comparing them to cured but nonaged specimens. The following examples will more clearly illustrate the novelty and utility of this invention.

EXAMPLE 1

This formulation consisted of 100 parts by weight styrene-butadiene copolymer with a styrene-butadiene weight ratio of 23.5 to 76.5, 40 parts by weight of carbon black N-550, 12 parts by weight trimethylol propane trimethacrylate, and 2.4 parts by weight of commercially available trilauryl trithio phosphite (TLTTP). The above ingredients were blended by a standard roll-milling operation; the rolls were 12 inches wide and 6 inches in diameter and were rotating about 20 rpm. There were no steps taken to either heat or cool the formulation during the milling operation. After blending, the formulation was pressed into sheet form at a thickness of about 100 mils and subjected to a radiation dose of 14 megarads. The equipment used was a 1.5 Mev electron accelerator produced by Radiation Dynamics; the current was 4.2 milliamps. Table III shows that this elastomer had an original tensile strength of 1,900 psi, and after 70 hours aging at 257° F. the tensile strength was 1,500 psi. This was deemed to be an acceptable loss and, therefore, the antioxidant was effective. The tensile strength after aging of these samples was about three times greater than that of either the radiation cured elastomers with the conventional antioxidants or the sulfur cured elastomers with the phosphite ester antioxidants.

EXAMPLE 2

The formulation, blending, radiation and testing procedures were the same as described in Example 1 with the exception that 2.0 parts by weight of commercially available distearyl pentaerythritol diphosphite was used as the antioxidant. Table III shows that the tensile strength of the resulting elastomer before aging was 1,500 psi, and after aging for 70 hours at 257° F. the tensile strength was 1,300 psi. This was also an acceptable performance.

EXAMPLE 3

The formulation, blending, radiation and testing procedures were the same as described in Example 1 with the exception that 2.1 parts by weight of a commercially available hexathio-diphosphite was used as the antioxidant; this compound has the following formula:

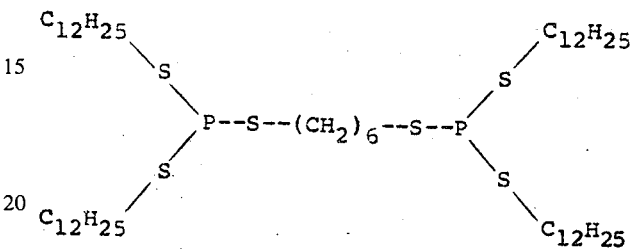

Table III shows this compound to also be effective as an antioxidant as the tensile strength of the elastomer after 70 hours at 257° F. was 1,600 psi as compared to 1,900 psi before aging.

Table III

| Antioxidant | Original Tensile Strength (PSI) | Tensile Strength After Aging 70 Hours At 257° F. |
|---|---|---|
| Trilauryl trithio phosphite (TLTTP) | 1900 | 1500 |
| A hexathio diphosphite compound | 1900 | 1600 |
| Distearyl pentaerythritol diphosphite | 1500 | 1300 |

The preferred embodiments and the specific examples illustrated formulations with specific concentrations of each ingredient; however, it should be understood that the process is effective with formulations having a range of ingredient concentrations. For example, the phosphite esters are effective at concentrations above about 2 percent by weight and the upper limit, preferably about 15 percent, is set by the effect of this additive on the physical properties of the elastomer. The styrene to butadiene weight ratio may vary from 15:85 to 50:50. The filler concentration in this cured composition may vary from 0 to 50 percent by weight. Finally, the crosslinking monomer concentration may vary from 3 to 20 percent by weight, but a more limited range of 6 to 12 percent is preferred, because these concentrations insure a sufficiently crosslinked matrix after exposure to a reasonable radiation dose without detracting from the physical properties of the elastomer.

While my invention has been described in terms of certain preferred embodiments, it will be appreciated that other forms thereof could readily be adapted by one skilled in the art. Therefore, the scope of my invention is not limited to the specific embodiments illustrated.

What is claimed is:

1. In the process of crosslinking and curing a styrene-butadiene copolymer having a styrene to butadiene weight ratio in the range of 15:85 to 50:50 by the bombardment of high energy electrons, the improvement comprising incorporating an organic phosphite ester in the noncrosslinked styrene-butadiene copolymer composition prior to irradiation, said ester being selected from the group consisting of a pentaerythritol diphosphite having the general formula:

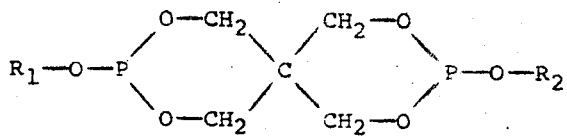

where $R_1$ and $R_2$ are alkyl groups containing from 12 to 20 carbon atoms, and a hexathio diphosphite having the general formula:

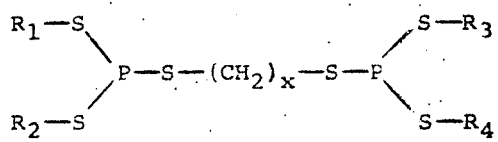

where $R_1$, $R_2$, $R_3$ and $R_4$ are alkyl groups containing from 10 to 15 carbon atoms and $x$ is from 4 to 8, said organic phosphite ester being present in an amount ranging from 2 parts by weight to 15 parts by weight per 100 parts by weight of said styrene-butadiene copolymer composition, said organic phosphite ester being substantially nonreactive and noncatalytic during said irradiation induced crosslinking process and remaining in the crosslinked styrene-butadiene copolymer composition to provide protection against oxidative degradation.

2. A method of producing a crosslinked and cured styrene-butadiene copolymer having a styrene-butadiene weight ratio ranging from 15:85 to 50:50 and having resistance to oxidative degradation comprising
providing a mixture consisting essentially of an uncrosslinked styrene-butadiene copolymer with a copolymer to said mixture weight fraction ranging from 0.3 to 0.95, a crosslinking monomer with a monomer to said mixture weight fraction ranging from 0.03 to 0.20, a reinforcing filler with a filler to said mixture weight fraction ranging from 0 to 0.50, and an organic phosphite ester antioxidant selected from the group consisting of a pentaerythritol diphosphite having the general formula:

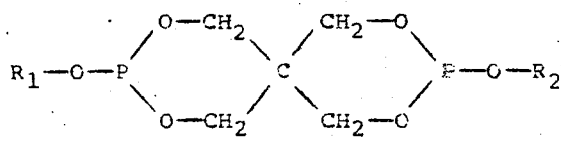

where $R_1$ and $R_2$ are alkyl groups containing from 12 to 20 carbon atoms, and a hexathio diphosphite having the general formula:

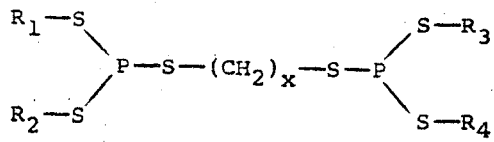

where $R_1$, $R_2$, $R_3$ and $R_4$ are alkyl groups containing from 10 to 15 carbon atoms and $x$ is from 4 to 8, with an antioxidant to said mixture weight fraction ranging from 0.02 to 0.15 and
subjecting said mixture to a bombardment of high energy electrons to effect the crosslinking of said mixture, with said organic phosphite ester being nonreactive and noncatalytic during said radiation process and providing protection against oxidative degradation in the crosslinked mixture.

3. An electron beam crosslinked styrene-butadiene copolymer composition resistant to oxidative degradation comprising a crosslinked styrene-butadiene copolymer having a styrene to butadiene weight ratio ranging from 15:85 to 50:50, 0 to 50 percent by weight of a reinforcing filler, and 2 to 15 percent by weight of an organic phosphite ester antioxidant selected from the group consisting of a pentaerythritol diphosphite having the general formula:

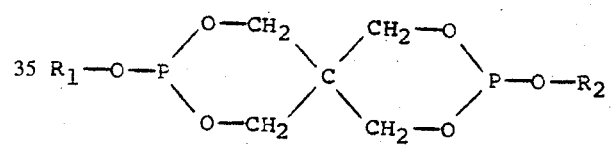

where $R_1$ and $R_2$ are alkyl groups containing from 12 to 20 carbon atoms, and a hexathio diphosphite having the general formula:

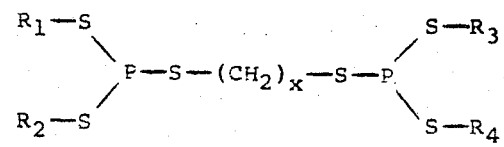

where $R_1$, $R_2$, $R_3$ and $R_4$ are alkyl groups containing from 10 to 15 carbon atoms and $x$ is from 4 to 8.

* * * * *